US010021578B2

(12) United States Patent
Li et al.

(10) Patent No.: US 10,021,578 B2
(45) **Date of Patent: *Jul. 10, 2018**

(54) LOCAL FORWARDING METHOD AND SYSTEM FOR USER PLANE DATA, AND LOCAL GATEWAY

(71) Applicant: ZTE CORPORATION, Shenzhen, Guangdong Province (CN)

(72) Inventors: Zhijun Li, Shenzhen (CN); Zhenhua Xie, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/345,890

(22) Filed: Nov. 8, 2016

(65) Prior Publication Data

US 2017/0055306 A1 Feb. 23, 2017

Related U.S. Application Data

(62) Division of application No. 14/370,769, filed as application No. PCT/CN2012/087290 on Dec. 24, 2012, now Pat. No. 9,526,123.

(30) Foreign Application Priority Data

Jan. 5, 2012 (CN) .......................... 2012 1 0002227

(51) Int. Cl.
*H04W 24/02* (2009.01)
*H04W 76/12* (2018.01)
(Continued)

(52) U.S. Cl.
CPC ........... *H04W 24/02* (2013.01); *H04W 76/12* (2018.02); *H04W 80/04* (2013.01); *H04W 88/16* (2013.01)

(58) Field of Classification Search
CPC ... H04W 24/02; H04W 76/022; H04W 80/04; H04W 88/16
See application file for complete search history.

(56) References Cited

U.S. PATENT DOCUMENTS 5,159,592 A * 10/1992 Perkins ............ H04L 29/12216 370/338
6,137,791 A * 10/2000 Frid ....................... H04W 8/10 370/331

(Continued)

FOREIGN PATENT DOCUMENTS

CN 101742690 A 6/2010
CN 102111825 A 6/2011

(Continued)

OTHER PUBLICATIONS

Local GW based Architecture; NEC; 3GPP TSG SA WG2 Meeting #75; Aug. 31-Sep. 4, 2009, Kyoto, Japan; TD S2-096015. XP050397318.

*Primary Examiner* — Mohammad S Anwar
(74) *Attorney, Agent, or Firm* — Ling Wu; Stephen Yang; Ling and Yang Intellectual Property

(57) ABSTRACT

A local switching method for user plane data includes: after being triggered, a level 1 data node judging whether a direct tunnel can be established for a source user equipment and a target user equipment, and if so, establishing a direct tunnel between a source level 2 data node and a target level 2 data node for the source user equipment and the target user equipment; after receiving an IP data packet transmitted by the source user equipment to the target user equipment, the source level 2 data node forwarding the IP data packet to the target level 2 data node through the direct tunnel between the source level 2 data node and the target level 2 data node, so that the target level 2 data node forwards the IP data packet to the target user equipment.

15 Claims, 6 Drawing Sheets

UE1
eNB1
LGW
MME
PGW
1101. Attachment/bearer creation request
1102. Bearer creation request
1103. Create an IP bearer
1104. IP allocation notification
1105. Create a radio bearer
1106. IP allocation response
1107. Create a bearer response
1108. Attachment/bearer creation response

(51) Int. Cl.

| | |
|---|---|
| *H04W 80/04* | (2009.01) |
| *H04W 88/16* | (2009.01) |

(56) References Cited

U.S. PATENT DOCUMENTS

| | | | | |
|---|---|---|---|---|
| 9,526,123 | B2 * | 12/2016 | Li | H04L 61/2007 |
| 2003/0154297 | A1 * | 8/2003 | Suzuki | H04L 29/06<br>709/229 |
| 2006/0120386 | A1 | 6/2006 | Rossi et al. | |
| 2008/0310404 | A1 | 12/2008 | Valme et al. | |
| 2009/0109933 | A1 | 4/2009 | Murasawa et al. | |

FOREIGN PATENT DOCUMENTS

| | | | |
|---|---|---|---|
| CN | 102291796 | A | 12/2011 |
| WO | WO0163947 | A1 | 8/2001 |
| WO | WO2011018235 | | 2/2011 |

* cited by examiner

LOCAL FORWARDING METHOD AND SYSTEM FOR USER PLANE DATA, AND LOCAL GATEWAY

RELATED APPLICATION

This is a divisional application of application Ser. No. 14/370,769, filed on Jul. 4, 2014, which is a national stage application under 35 U.S.C. 154(d)(4) and 35 U.S.C. 371 for PCT/CN2012/087290, filed on Dec. 24, 2012 and claimed priority under 35 U.S.C. 119(a) and 35 U.S.C. 365(b) to Chinese Patent Application No. CN20120002227.0, filed on Jan. 5, 2012.

TECHNICAL FIELD

The present document relates to the field of communications, and in particular, to a local switching method and system for user plane data and a local gateway.

BACKGROUND OF THE RELATED ART

In mobile communication, communication may occur between a User Equipment (UE for short, which is also referred to as a terminal or a user terminal) and an Application Server (AS for short), or may also occur between two UEs. Communication between two UEs may be forwarded through an AS, or may also occur through an end-to-end IP data stream between two UEs.

In mobile communication, a Packet Service (PS) network provides IP-based data communication. An IP allocation entity is responsible for an IP address of the UE, and all IP data streams need to pass through that IP allocation entity.

FIG. 1 is a diagram of architecture of a UE accessing a packet domain according to the related technology. As shown in FIG. 1, the structure relates to a UE, a UMTS Terrestrial Radio Access Network (UTRAN for short), an Evolved UMTS (E-UTRAN for short), a Serving GPRS Supporting Node (SGSN for short), a Mobile Management Entity (MME for short), a Home Location Register (HLR for short)/Home Subscriber Server (HSS for short), a Serving Gateway (SGW for short), a Packet Data Network Gateway (PGW for short), a Gateway GPRS Supporting Node (GGSN for short) and an AS. Wherein, the PGW and the GGSN are IP allocation entities under the E-UTRAN and UTRAN/GERAN respectively, and the GGSN and the PGW can be collectively referred to as a public data network gateway.

The UE can access to a core network through the UMTS and the E-UTRAN, and after an IP address is allocated to the UE, the UE can implement IP communication with the AS and other terminals. In the process of communication, after passing through the base station, the IP data streams are forwarded to a pubic data network gateway (GGSN/PGW), and then are transmitted to an AS and a target end UE by the GGSN/PGW according to a routing rule. Wherein, the communication from the UE to the base station and from the base station to the pubic data network gateway (GGSN/PGW) is not based on the IP routing rule, and instead, is based on a routing technology of an underlying link. In the whole process, the base station does not perceive information of the IP layer, for example, the base station does not know information such as the IP address, the port of the UE etc.

In such technical background, even though the UEs implement Peer-to-Peer (P2P) communication through the IP under the same base station, the IP data packet also must detour to the public data network gateway (GGSN/PGW) located on an upper layer. Particularly when the public data network gateway (GGSN/PGW) is located in a home network and two UEs which communicate with each other are located in a visited network, such media routing phenomenon is especially true. FIG. 2 illustrates such detour of an IP data stream. In FIG. 2, a communication link between UE1 and UE2 is UE1→eNodeB→SGW→PGW→(a forwarding network)→SGW→eNodeB→UE2. Obviously, it can be seen that the IP data stream from UE1 to UE2 is transmitted from the same base station eNodeB, and returned to the eNodeB after a full circle.

Such phenomenon is more and more prominent with the progress of the mobile broadband. In the evolution of mobile networks, the mobile networks increasingly show the characteristics of broadband network. With the wide application of smart phones, transmission media data streams in the mobile network are more and more frequent. Notably, as the social application and location based communication application are more and more popular, data traffic in the same area (under the same base station, near the range of the base station) is more and more large. Such traffic needs to detour to the public data network gateway (GGSN/PGW) of the core network, which largely increases backhaul bandwidth requirements, increases delay of the IP communication, and also increases burden of the public data network gateway (GGSN/PGW). In addition, as mobile broadband is more and more thorough, the increasing IP data traffic also makes forward higher requirements on the public data network gateway (GGSN/PGW) of the core network.

In order to deal with the requirements of the increased traffic, operators must increase more public data network gateway (GGSN/PGW) devices, but monthly fee per user presents a downtrend, which also makes the investment and profit of the operators more and more out of balance.

SUMMARY

For the optimization problem of IP communication between different user terminals under the same base station/near the base station in the related technology, the present document provides a local switching method and system for user plane data and a local gateway, to at least solve the above problem.

In order to solve the above problem, the present document provides a local switching method for user plane data, comprising:

after being triggered, a level 1 data node judging whether a direct tunnel can be established for a source User Equipment (UE) and a target UE, and if so, establishing a direct tunnel between a source level 2 data node and a target level 2 data node for the source UE and the target UE; and after receiving an IP data packet transmitted by the source UE to the target UE, the source level 2 data node forwarding the IP data packet to the target level 2 data node through the direct tunnel between the source level 2 data node and the target level 2 data node, so that the target level 2 data node forwards the IP data packet to the target UE.

Optionally, the above method may further have the following features: the triggering is that the level 1 data node receives the IP data packet transmitted by the source UE to the target UE, or receives a notification transmitted by an ancestor data node that a direct tunnel is established for the source UE and the target UE.

Optionally, the above method may further have the following features: the ancestor data node notifies the level 1 data node to establish a direct tunnel for the source UE and the target UE in the following case:

after receiving the IP data packet transmitted by the source UE to the target UE, the ancestor data node judges that a direct tunnel can be established for the source UE and the target UE, and notifies the level 1 data node to establish the direct tunnel for the source UE and the target UE.

Optionally, the above method may further have the following features: whether a direct tunnel can be established for the source UE and the target UE is judged according to the following factor:

judging according to an identity and/or IP address of the source UE and an identity and/or IP address of the target UE.

Optionally, the above method may further have the following features: the level 1 data node is a packet data network gateway, the source level 2 data node is a source serving gateway, the target level 2 data node is a target serving gateway; or the level 1 data node is a gateway General Packet Radio Service (GPRS) supporting node, and the level 2 data node is a base station controller/a radio network controller.

Optionally, the above method may further have the following features: the level 1 data node is a serving gateway, the source level 2 data node is a source base station, and the target level 2 data node is a target base station.

Optionally, the above method may further have the following features: when the source level 2 data node and the target level 2 data node are the same base station, establishing a direct tunnel between the source level 2 data node and the target level 2 data node refers to establishing a direct tunnel for the source UE and the target UE in the base station.

Optionally, the above method may further have the following features: the method further comprises: after an IP address of the source UE or the target UE is released, the source level 2 data node and the target level 2 data node releasing the direct tunnel between the source UE and the target UE.

The present document further provides a local switching system for user plane data, comprising a level 1 data node and a source level 2 data node, wherein, the level 1 data node is configured to judge whether a direct tunnel can be established for a source User Equipment (UE) and a target UE after being triggered, and if so, indicate the source level 2 data node and a target level 2 data node to establish a direct tunnel for the source UE and the target UE; and the source level 2 data node is configured to establish the direct tunnel with the target level 2 data node after receiving the indication from the level 1 data node; and forward an IP data packet to the target level 2 data node through the direct tunnel between the source level 2 data node and the target level 2 data node after receiving the IP data packet transmitted by the source UE to the target UE, so that the target level 2 data node forwards the IP data packet to the target UE.

Optionally, the above system may further have the following features: the triggering is that the level 1 data node receives the IP data packet transmitted by the source UE to the target UE, or receives a notification transmitted by an ancestor data node that a direct tunnel is established for the source UE and the target UE.

Optionally, the above system may further have the following features: the system further comprises the ancestor data node, configured to notify the level 1 data node to establish a direct tunnel for the source UE and the target UE in the following case:

after receiving the IP data packet transmitted by the source UE to the target UE, the ancestor data node judges that a direct tunnel can be established for the source UE and the target UE, and notifies the level 1 data node to establish the direct tunnel for the source UE and the target UE.

Optionally, the above system may further have the following features: the level 1 data node judges whether a direct tunnel can be established for the source UE and the target UE according to the following factor:

judging according to an identity and/or IP address of the source UE and an identity and/or IP address of the target UE.

Optionally, the above system may further have the following features: the level 1 data node is a packet data network gateway, the source level 2 data node is a source serving gateway, the target level 2 data node is a target serving gateway; or the level 1 data node is a gateway General Packet Radio Service (GPRS) supporting node, and the level 2 data node is a base station controller/a radio network controller.

Optionally, the above system may further have the following features: the level 1 data node is a serving gateway, the source level 2 data node is a source base station, and the target level 2 data node is a target base station.

Optionally, the above system may further have the following features: when the source level 2 data node and the target level 2 data node are the same base station, establishing a direct tunnel between the source level 2 data node and the target level 2 data node refers to establishing a direct tunnel for the source UE and the target UE in the base station.

Optionally, the above system may further have the following features: the source level 2 data node is further configured to release the direct tunnel between the source UE and the target UE after the IP address of the source UE or the target UE is released.

The present document further provides a local switching method for user plane data, comprising:

deploying a Local Gateway (LGW) in a network;

after allocating an IP address to a User Equipment (UE) or releasing an IP address of the UE, a public data network gateway notifying the allocation or release of the IP address of the UE to the LGW to which the UE belongs, and the LGW registering or deregistering the IP address of the UE; and after receiving an IP data packet forwarded by a source base station which is transmitted by a source UE to a target UE, the LGW judging whether the IP address of the target UE is registered on the LGW, and if so, transmitting the IP data packet to a target base station to which the target UE is connected.

Optionally, the above method may further have the following features: the method further comprises: when judging that the IP address of the target UE is not registered on the LGW, the LGW forwarding the IP data packet to an ancestor node.

Optionally, the above method may further have the following features: the method further comprises:

after receiving an indication from the ancestor node, the LGW establishing, with a target node indicated by the ancestor node, a direct tunnel between the source UE and the target UE, and after subsequently receiving an IP data packet transmitted by the source UE to the target UE, forwarding the IP data packet to the target node through the direct tunnel, so that the target node forwards the IP data packet to the target UE.

Optionally, the above method may further have the following features: the LGW is deployed on the base station or is deployed on a serving gateway or is independently deployed and connected to the base station and the serving gateway.

The present document further provides a Local Gateway (LGW), comprising:

an IP address management unit, configured to register or deregister an IP address of a User equipment (UE) after receiving a notification that a public data network gateway allocates an IP address to the UE or releases the IP address of the UE; and a data forwarding unit, configured to judge whether an IP address of a target UE is registered on the LGW after receiving an IP data packet forwarded by a source base station which is transmitted by a source UE to the target UE, and if so, transmit the IP data packet to a target base station to which the target UE is connected.

Optionally, the above LGW may further have the following features: the data forwarding unit is further configured to forward the IP data packet to an ancestor node when judging that the IP address of the target UE is not registered on the LGW.

Optionally, the above LGW may further have the following features:

the data forwarding unit is further configured to establish, with a target node indicated by the ancestor node, a direct tunnel between the source UE and the target UE after receiving an indication from the ancestor node, and forward the IP data packet to the target node through the direct tunnel after subsequently receiving an IP data packet transmitted by the source UE to the target UE, so that the target node forwards the IP data packet to the target UE.

Optionally, the above LGW may further have the following features:

the LGW is deployed on the base station or is deployed on a serving gateway or is independently deployed and connected to the base station and the serving gateway.

The present document further provides a local switching system for user plane data, comprising the above mentioned local gateway (LGW), and further comprising a public data network gateway, configured to notify an allocation or release of an IP address of a User Equipment (UE) to the LGW to which the UE belongs after allocating an IP address to the UE or releasing the IP address of the UE.

With the embodiments of the present document, effects of optimizing IP data forwarding and reducing load of the public data network gateway (GGSN/PGW) are achieved.

DETAILED DESCRIPTION

Figure 1:
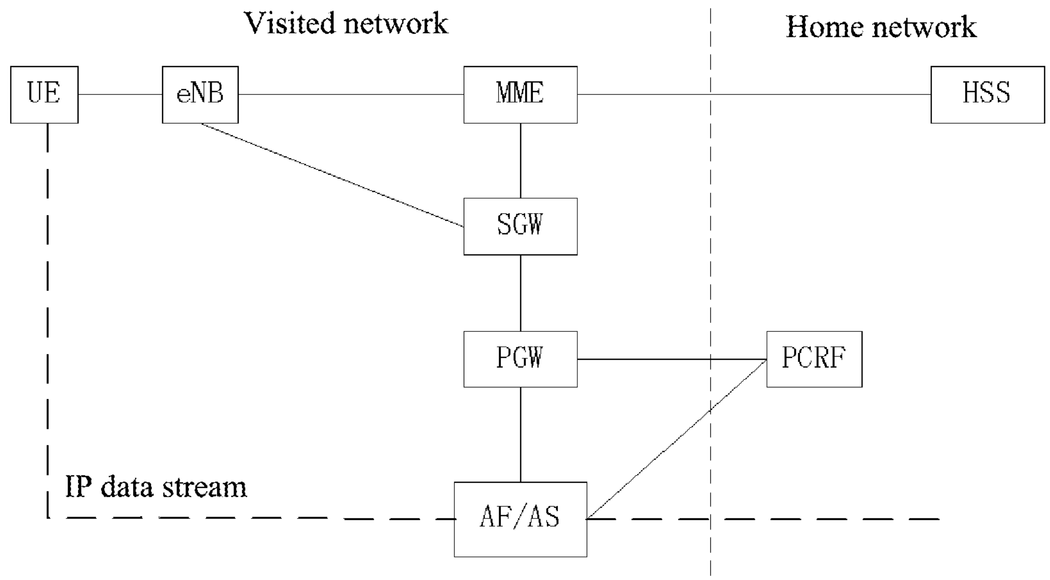
FIG. 1 is a diagram of architecture of a UE accessing to a packet domain according to the related technology.
Figure 2:
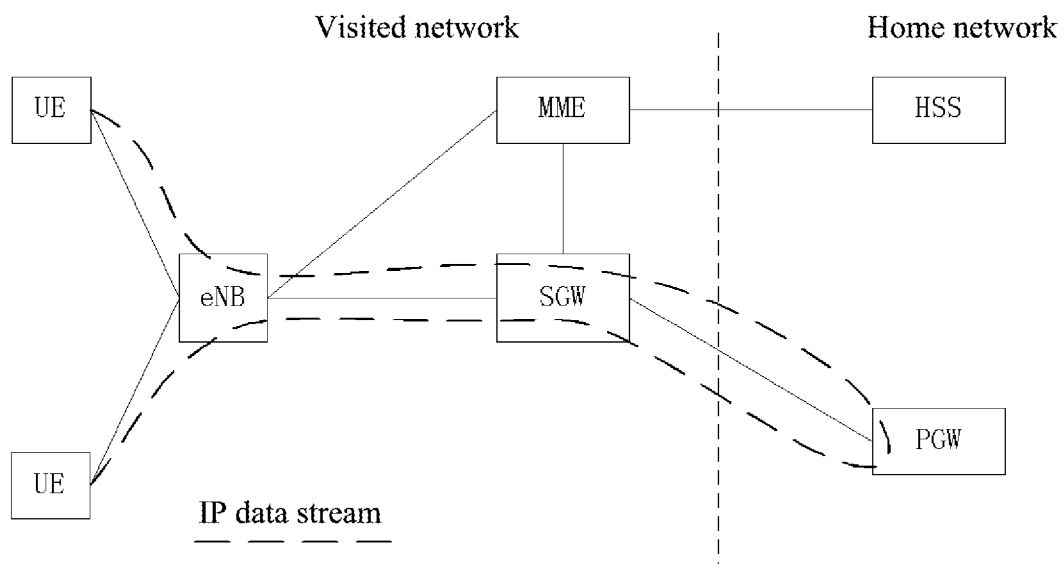
FIG. 2 is a situation of IP data communication between different UEs under the same base station/near the base station according to the related technology.

The embodiments of the present document will be described in detail in conjunction with accompanying drawings hereinafter. It should be illustrated that, in the case of no conflict, the embodiments of this application and the features in the embodiments could be combined randomly with each other.

The embodiments of the present document provide a local switching method for user plane data, comprising:

after being triggered, a level 1 data node judging whether a direct tunnel can be established for a source User Equipment (UE) and a target UE, and if so, establishing a direct tunnel between a source level 2 data node and a target level 2 data node for the source UE and the target UE; and after receiving an IP data packet transmitted by the source UE to the target UE, the source level 2 data node forwarding the IP data packet to the target level 2 data node through the direct tunnel between the source level 2 data node and the target level 2 data node, so that the target level 2 data node forwards the IP data packet to the target UE.

The triggering is that the level 1 data node receives the IP data packet transmitted by the source UE to the target UE, or receives a notification transmitted by an ancestor data node that a direct tunnel is established for the source UE and the target UE.

Wherein, the ancestor data node notifies the level 1 data node to establish a direct tunnel for the source UE and the target UE in the following case:

after receiving the IP data packet transmitted by the source UE to the target UE, the ancestor data node judges that a direct tunnel can be established for the source UE and the target UE, and notifies the level 1 data node to establish the direct tunnel for the source UE and the target UE.

Wherein, whether a direct tunnel can be established for the source UE and the target UE is judged according to the following factor:

judging according to an identity and/or IP address of the source UE and an identity and/or IP address of the target UE.

Wherein, the level 1 data node is a serving gateway, the source level 2 data node is a source base station, and the target level 2 data node is a target base station.

Wherein, when the source level 2 data node and the target level 2 data node are the same base station, establishing a direct tunnel between the source level 2 data node and the target level 2 data node refers to establishing a direct tunnel for the source UE and the target UE in the base station.

Wherein, the method further comprises: after an IP address of the source UE or the target UE is released, the source level 2 data node and the target level 2 data node releasing the direct tunnel between the source UE and the target UE.

A local switching method for user plane data is provided, comprising:

deploying a Local Gateway (LGW) in a network;

after allocating an IP address to a User Equipment (UE) or releasing an IP address of the UE, a public data network gateway notifying the allocation or release of the IP address of the UE to the LGW to which the UE belongs, and the LGW registering or deregistering the IP address of the UE; and after receiving an IP data packet forwarded by a source base station which is transmitted by a source UE to a target UE, the LGW judging whether the IP address of the target UE is registered on the LGW, and if so, transmitting the IP data packet to a target base station to which the target UE is connected.

Wherein, the method further comprises: when judging that the IP address of the target UE is not registered on the LGW, the LGW forwarding the IP data packet to an ancestor node.

Wherein, the method further comprises:

after receiving an indication from the ancestor node, the LGW establishing with a target node indicated by the ancestor node a direct tunnel between the source UE and the target UE, and after subsequently receiving an IP data packet transmitted by the source UE to the target UE, forwarding the IP data packet to the target node through the direct tunnel, so that the target node forwards the IP data packet to the target UE.

Wherein, the LGW is deployed on the base station or is deployed on a serving gateway or is independently deployed and connected to the base station and the serving gateway.

Embodiment One

Figure 3:
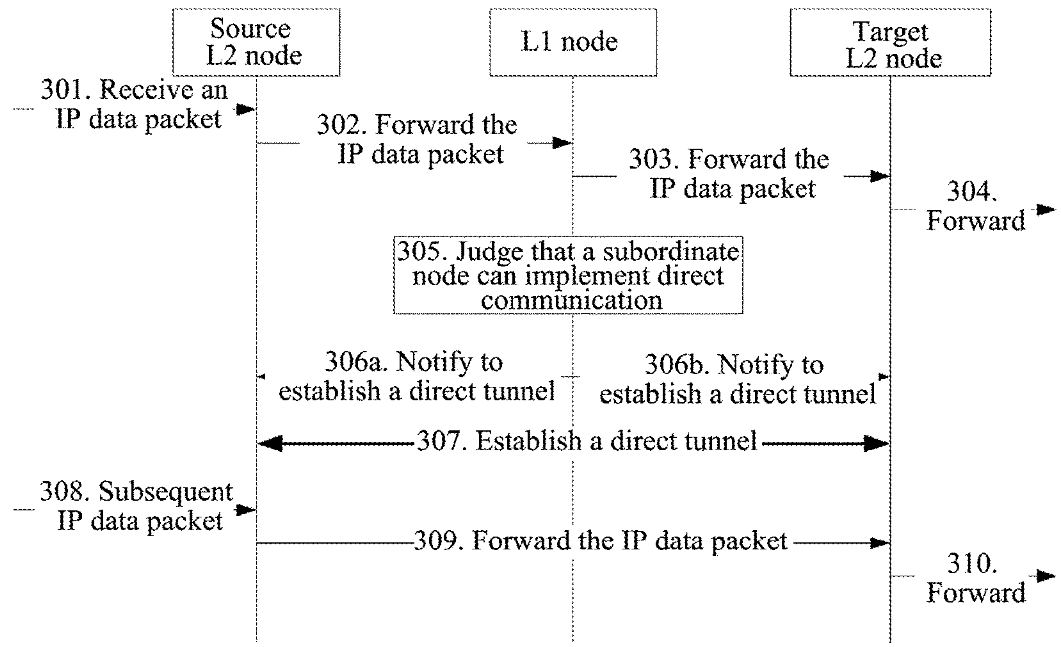
FIG. 3 is a flow diagram of embodiment one of the present document, which is a flow diagram of an ancestor data node indicating a subordinate data node to establish a direct tunnel for a UE.

FIG. 3 is a flow diagram of embodiment one of the present document, which is a flow diagram of an ancestor data node indicating a subordinate data node to establish a direct tunnel for a UE.

If E-UTRAN/EPS access is taken as an example, and a level 1 data node (L1Node) may be a PGW, a level 2 data node (L2Node) may an SGW. Alternatively, if the L1Node is an SGW, the L2Node may be an eNodeB.

In FIG. 3, when the L1Node receives an IP data packet transmitted by the L2Node, if the L1Node judges that a level 2 data node (S-L2Node) which transmits data and a level 2 data node (D-L2Node) which receives data can establish a direct tunnel, the L1Node indicates the S-L2Node and the D-L2Node to establish a direct tunnel. After a direct tunnel is established between the S-L2Node and the D-L2Node, the S-L2Node can transmits an IP data packet which is received subsequently to the D-L2Node through the direct tunnel, thus implementing the purpose of directly forwarding the IP data stream between subordinate data nodes.

As shown in FIG. 3, the method includes the following steps.

In step 301, the S-L2Node receives an IP data packet transmitted by UE1;

in step 302, the S-L2Node forwards the received IP data packet to the L1Node according to a routing/forwarding rule;

in step 303, after receiving the IP data packet forwarded by the S-L2Node, the L1Node forwards the IP data packet to the D-L2Node according to the routing/forwarding rule;

in step 304, the D-L2Node forwards the IP data packet, which finally arrives at UE2;

in step 305, after receiving the IP data packet forwarded by the S-L2Node, the L1Node is triggered to judge whether a direct tunnel mode can be established;

the L1Node comprehensively judges that the S-L2Node and the D-L2Node can establish a direct tunnel to implement direct communication according to the information of the IP data packet, the routing/forwarding rule and other configuration information.

Step 305 can be performed immediately after the L1-Node performs S303, or can also be performed before step 303.

In step 306*a/b*, the L1Node notifies the S-L2Node and the D-L2Node to establish a direct tunnel respectively;

in step 307, the S-L2Node and the D-L2Node establish a direct tunnel;

thereafter, in step 308, the S-L2Node receives a subsequent IP data packet;

In step 309, if the S-L2Node judges that the IP data packet should finally be routed/forwarded to the D-L2Node, and there is a direct tunnel between the S-L2Node and the D-L2Node, then the S-L2Node forwards the subsequent IP data packet to the D-L2Node through the direct tunnel;

in step 310, the D-L2Node forwards the IP data packet, which finally arrives at UE2.

Under the EUTRAN/EPS access, all IP data should pass through the PGW, even though two UEs are under the same PGW, the same SGW, or even the same base station. With application of the flow illustrated in embodiment one (FIG. 3) of the present document, after the PGW receives an IP data stream transmitted by a source UE to a target UE, it can be judged that:

A. both UEs are not under the same PGW;

B. both UEs are under the same PGW but under different SGWs;

both UEs may be under different eNodeBs;

both UEs may be under the same eNodeB;

C. both UEs are under the same PGW and under the same SGW, and:

both UEs are under different eNodeBs;

both UEs are under the same eNodeB;

For A) scenario, if the source UE and the target UE are not under the same PGW, the PGW does not necessarily know the SGW under which the target UE is located, and therefore, for this scenario, the PGW can not consider indicating the source SGW and the target SGW to establish a direct tunnel to implement direct communication. The present document is suitable to UEs under the same PGW.

For B) scenario, as the source UE and the target UE are under the same PGW, the PGW knows respective SGWs of the source UE and the target UE and a direct tunnel can be established between the source SGW and the target SGW, the PGW can indicate the source SGW and the target SGW to establish a direct tunnel to implement direct communication. The specific flow is as shown in FIG. 4.

Figure 5:
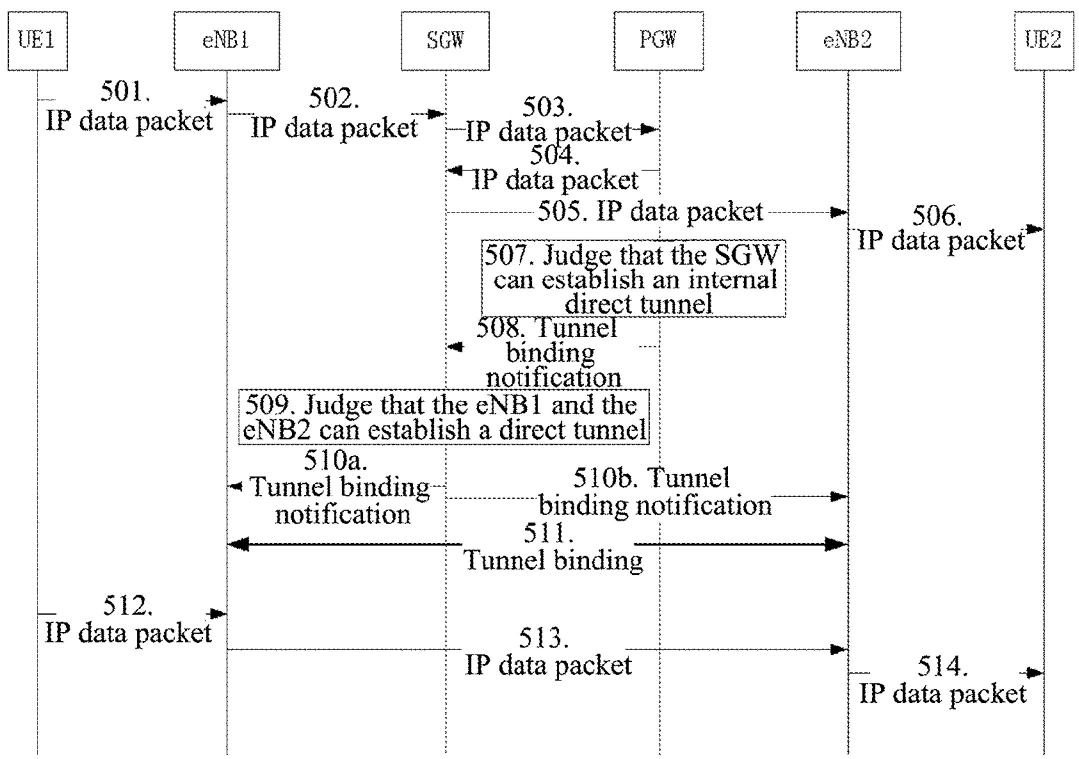
FIG. 5 is a flow diagram of a PGW indicating a source eNodeB and a target eNodeB through an SGW to establish a direct tunnel when UEs are under different eNodeBs of the same SGW, by taking EUTRAN/EPS access as an example, according to embodiment one of the present document.

For C) scenario, as the source UE and the target UE are under the same SGW, the PGW can indicate the SGW to establish an internal direct tunnel for the source UE and the target UE. If C.a). both UEs are under different eNodeBs and both eNodeBs can establish a direct tunnel, the SGW indicates the source eNodeB and the target eNodeB to establish a direct tunnel to implement direct communication. The specific flow is as shown in FIG. 5.

Figure 6:
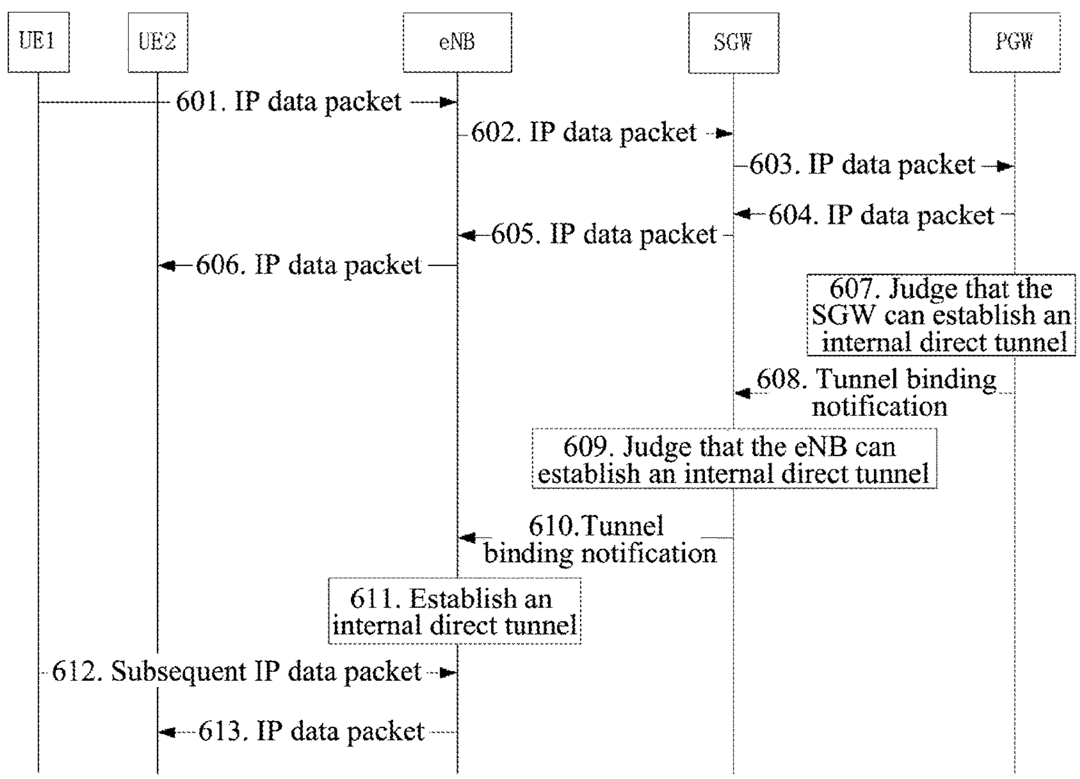
FIG. 6 is a flow diagram of a PGW indicating an eNodeB through an SGW to establish an internal direct tunnel for a UE when UEs are under the same eNodeB, by taking EUTRAN/EPS access as an example, according to embodiment one of the present document.

C.b). both UEs are under the same eNodeB, the SGW indicates the eNodeB to establish an internal direct tunnel for the source UE and the target UE to implement direct communication. The specific flow is as shown in FIG. 6.

Figure 4:
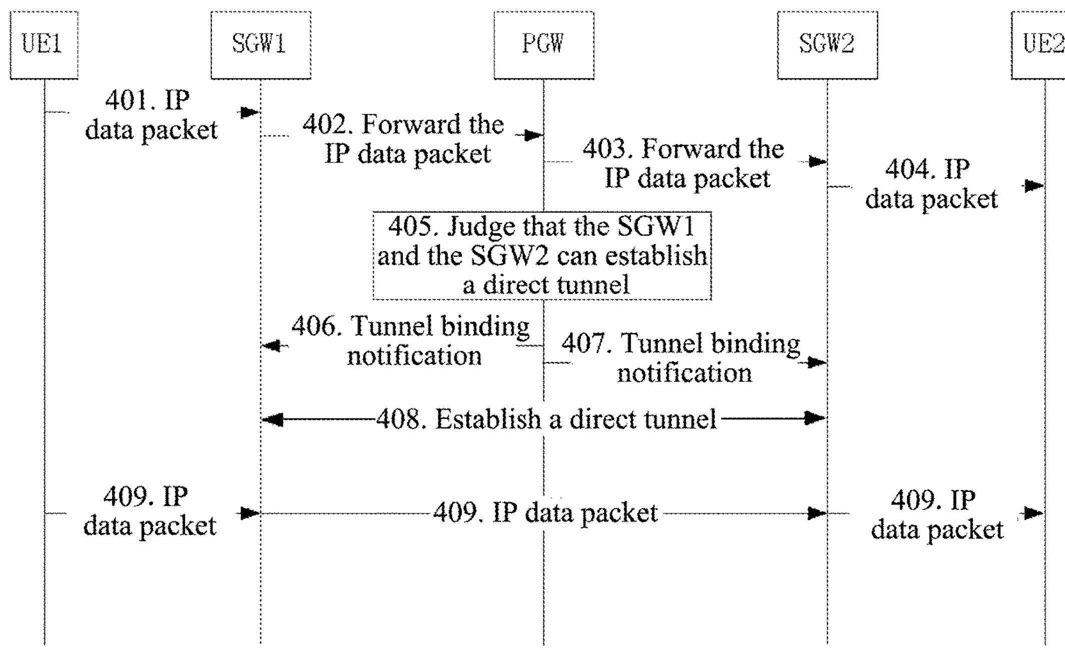
FIG. 4 is a flow diagram of a PGW indicating a source SGW and a target SGW to establish a direct tunnel when UEs are under different SGWs, by taking EUTRAN/EPS access as an example, according to embodiment one of the present document.

FIG. 4 is a flow diagram of a PGW indicating a source SGW and a target SGW to establish a direct tunnel when UEs are under different SGWs, by taking EUTRAN/EPS access as an example, according to embodiment one of the present document;

FIG. 4 is a specification of the flow of FIG. 3. In the flow of FIG. 4, the PGW plays a role as the L1Node, the SGW1 and the SGW2 play the roles as the S-L2Node and the D-L2Node respectively. Compared to the flow of FIG. 3, the specific detail process is as follows.

In step 405, after the PGW receives the IP data packet forwarded by the SGW1, there is the following information in the IP data packet:

an IP address and a port used by UE1: UE1-IP and UE1-Port;

an IP address and a port used by UE2: UE2-IP and UE2-Port;

as the following information of the UE is stored on the PGW: an identity (ID, which may be an IMSI, a P-TMSI etc.) of the UE, an IP of the UE, an ID of the SGW to which the UE accesses, and an IP etc. After the PGW receives the IP data packet of the UE, the PGW can find the SGW to which the UE accesses according to the IP information of the UE. Further, the PGW can judge that the two SGWs can establish a direct tunnel according to some configuration information, so as to rapidly forward the IP data packet directly from the SGW1 to the SGW2, without being forwarded through the PGW.

Thereby, based on the decision of step 405, the PGW can indicate the SGW1 and the SGW2 to require establishing a direct tunnel in steps 406 and 407 respectively.

In step 406, the PGW needs to notify the SGW1 of the following information which is used to establish the direct tunnel. The information may be represented as a triple:

(UE1-IP, UE2-IP and UE2-SGW-ID), or (UE1-IP, UE2-IP and UE2-SGW-IP);

alternatively, the PGW notifies the SGW1 of information which is used to establish a direct tunnel. The information may be a tetrad for expressing a complete binding relationship between the UE and the SGW:

(UE1-IP, UE2-IP, UE1-SGW-ID and UE2-SGW-ID), or (UE1-IP, UE2-IP, UE1-SGW-IP and UE2-SGW-IP).

Further, IDs of UE1 and UE2 may be added in the above triple and tetrad to constitute a quintuple and a six-tuple, for example, (UE1-ID, UE1-IP, UE2-ID, UE2-IP, UE1-SGW-ID and UE2-SGW-ID). The purpose of adding the IDs of UE1 and UE2 is to be able to add a binding relationship between the IP and the ID of the UE for some nodes (such nodes do not store the IP information of the UE directly, and only stores the ID information of the UE and the ID of the media bearer).

Correspondingly, in step 407, the PGW also notify the SGW2 to establish a direct tunnel with the same method.

After the SGW1 and the SGW2 obtain a necessary indication of establishing a direct tunnel, the SGW1 and the SGW2 may possibly exchange required information to confirm the connection and establish a direct tunnel. This direct tunnel may essentially be represented by a tetrad (UE1, UE2, UE1-SGW and UE2-SGW).

After step 408, a direct tunnel between the SGW1 and the SGW2 has been established. Thereafter, the IP data packet transmitted by UE1 to UE2 will be forwarded through the direct tunnel between the SGW1 and the SGW2, without detouring to the PGW.

FIG. 5 is a flow diagram of a PGW indicating a source eNodeB and a target eNodeB through an SGW to establish a direct tunnel, when UEs are under different eNodeBs of the same SGW, by taking EUTRAN/EPS access as an example, according to embodiment one of the present document, FIG. 5 is a specification of the flow of FIG. 3. Compared to the flow of FIG. 4, the flow of FIG. 5 primarily differs in that: as UE1 and UE2 are under the same SGW, the PGW firstly indicates the SGW to establish a direct tunnel for UE1 and UE2, and in the process of interaction between the PGW and the SGW, the PGW plays a role in L1Node, and the SGW plays a role in S-L2Node and D-L2Node. Thereafter, the SGW indicates the eNodeB1 and the eNodeB2 to establish a direct tunnel for the UE, and in the process of interaction between the SGW and the eNodeB1/eNodeB2, the SGW plays a role as the L1Node, and the eNodeB1 and eNodeB2 play roles as the S-L2Node and the D-L2Node respectively.

Compared to the flow illustrated in FIG. 4, there are following differences.

In steps 507-508, if the PGW judges that the SGWs to which UE1 and UE2 access are the same SGW, the PGW indicates the SGW to establish an internal direct tunnel for UE1 and UE2.

Specifically, with reference to the flow of FIG. 4, the triple transmitted by the PGW to the SGW is (UE1-IP, UE2-IP and SGW-ID) or (UE1-IP, UE2-IP and SGW-IP) or a corresponding tetrad. Another method is that the PGW uses an explicit identity to require the SGW to establish an internal direct tunnel for UE1 and UE2. After the SGW receives a notification from the PGW that an internal direct tunnel is established for UE1 and UE2, an internal direct tunnel is established for UE1 and UE2.

The step 507 may be synchronous with step 504, or may be before or after the step 507.

In steps 509~510*a*/*b*~511, after the SGW establishes the internal direct tunnel for UE1 and UE2, the SGW judges that UE1 and UE2 are located at different eNodeBs under the SGW, i.e., being located at the eNodeB1 and the eNodeB2 respectively, and the eNodeB1 and the eNodeB2 can establish a direct tunnel. In step 510*a*/510*b*, the SGW notifies the eNodeB1 and the eNodeB2 respectively to establish a direct tunnel. In step 511, the eNodeB1 and the eNodeB2 communicate to acquire necessary information to establish the direct tunnel.

The SGW analyzes that the eNodeBs to which UE1 and UE2 access, i.e., the eNodeB1 and the eNodeB2, can establish a direct tunnel according to the IDs, IPs of UE1 and UE2, a relationship between the eNodeBs to which UE1 and UE2 access, and local configuration information.

The SGW notifies the eNodeB1 to require establishing a direct tunnel for UE1 and UE2 with a method similar to that in FIG. 4, which is using a triple (UE1-IP, UE2-IP and eNodeB2-ID) or (UE1-IP, UE2-IP and eNodeB2-IP); or a tetrad (UE1-IP, UE2-IP, UE1-eNodeB-ID and UE2-eNodeB-ID) or (UE1-IP, UE2-IP, UE1-eNodeB-IP and UE2-eNodeB-IP). Similarly, ID information of the UEs may be added by the SGW in the triple and tetrad as needed to form a quintuple and a six-tuple.

After the eNodeB1 and the eNodeB2 establish the direct tunnel for the UEs, the eNodeB1 directly forwards the IP data, which are transmitted by UE1 to UE2, to the eNodeB2 through the direct tunnel, so that the eNodeB2 forwards the IP data to UE2.

It should be pointed out that in the related art, the eNodeB does not involve in the IP transport layer, i.e., the IP data stream is encapsulated in the user plane signaling, while the method in FIG. 5 requires the eNodeB to involve in the IP transport layer, identify and judge which IP data streams can be forwarded through the direct tunnel. This raises enhancements on the eNodeB, but the resultant benefits are also obvious.

FIG. 6 is a flow diagram of a PGW indicating an eNodeB through an SGW to establish an internal direct tunnel for a UE when UEs are under the same eNodeB, by taking EUTRAN/EPS access as an example, according to embodiment one of the present document.

The flows of FIG. 6 and FIG. 5 are based on the same principle, and the only difference is that in FIG. 6, UE1 and UE2 are under the same base station, and the SGW indicates the eNodeB to establish an internal direct tunnel for UE1 and UE2. This method is similar to the method of the PGW indicating the SGW to establish an internal direct tunnel in FIG. 5.

After an ancestor node indicates a subordinate node to establish the direct tunnel, the transmission of the IP data can be speeded up by using the direct tunnel. At the same time, the load of the ancestor node is also effectively reduced.

However, after the direct tunnel is established, it does not means that this tunnel always exists. When an IP bearer of the UE is released or an IP address of the UE is changed, a direct tunnel which has been established previously must be released.

Figure 7:
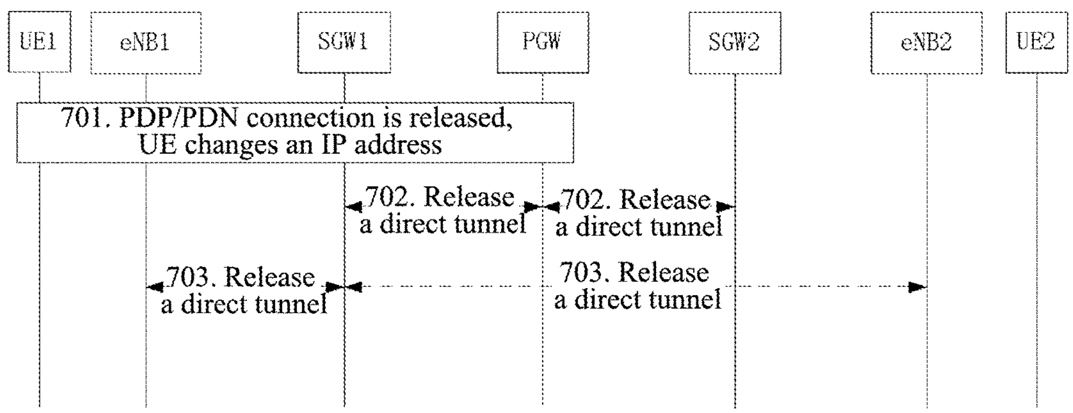
FIG. 7 illustrates an ancestor node indicating a subordinate node to cancel a direct tunnel, after an IP bearer of a UE is released or an IP of the UE is changed, according to embodiment two of the present document.

FIG. 7 is a flow diagram illustrating an ancestor node indicating a subordinate node to release a direct tunnel when an IP bearer of a UE is released or an IP address of the UE is changed, according to embodiment two of the present document.

In step 701, a UE or a network initiates an IP bearer release process, or the UE reselects the PGW due to switching, which results in reallocation of the IP address of the UE;

Here, the UE may be the source UE in the above process, or may also be a target UE.

In step 702, the PGW transmits a message of releasing a direct tunnel to the SGW which has established a direct tunnel for the UE;

Here, assuming that the PGW has established a direct tunnel between the SGW1 and the SGW2 for UE1 and UE2, the PGW transmits a notification to the SGW1 and the SGW2 to require releasing the direct tunnel. After receiving the message of releasing the direct tunnel, the SGW1 and the SGW2 release the direct tunnel. A typical feature of releasing the direct tunnel is to remove tuples for identifying the direct tunnel.

In step 703, if the eNodeB1 and the eNodeB2 are under the SGW1 and a direct tunnel has been established between the eNodeB1 and the eNodeB2 for UE1 and UE2, the SGW1 notifies the eNodeB1 and the eNodeB2 to release the direct tunnel.

In the above various embodiments, the PGW judges whether a direct tunnel is to be established, and in other embodiments, after receiving the IP data packet, the SGW or the eNodeB can judge whether to establish a direct tunnel.

By the establishment and release processes of the direct tunnel illustrated in the above FIGS. 3-7, with the E-UTRAN/EPS access technology, the purpose of directly forwarding the IP data through the direct tunnel between network nodes at the subordinate node can be achieved, which can effectively enhance the data transmission speed, saves the data traffic transmitted to the ancestor node, and reduces the load of the ancestor node.

The similar technology can be applied in the GERAN/UTRAN. For example, in the GERAN/UTRAN, the ancestor node is a GGSN, and the subordinate node is a Base Station Controller or Radio Network Controller (BSC/RNC) etc.

Embodiment three of the present document provides a method for directly forwarding IP data at a subordinate node through an LGW.

Figure 8:
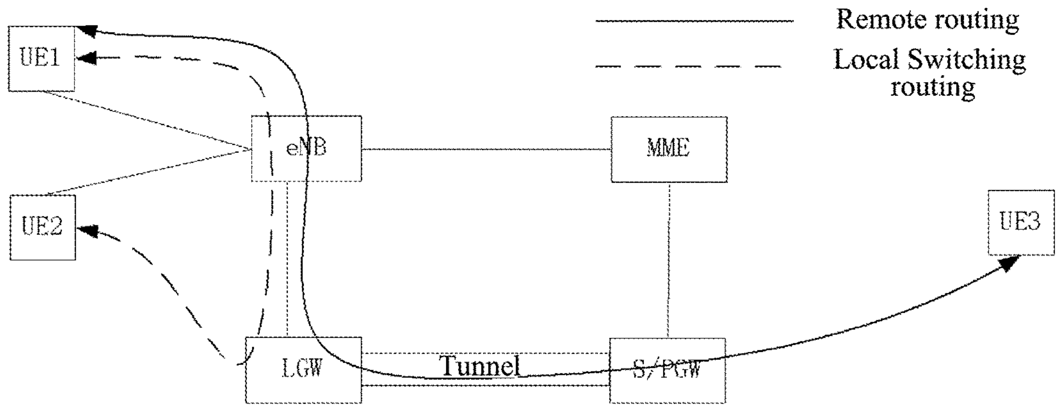
FIG. 8 is a diagram of architecture of embodiment three of the present document, which illustrates a scenario of a UE accessing to a PGW through an LGW.

FIG. 8 is a diagram of architecture corresponding to embodiment three of the present document. In FIG. 8, an LGW is deployed near a base station side, and the LGW has the following features:

the LGW and the PGW have a direct tunnel to provide forwarding of IP data;

an IP address pool used by the LGW (LGW-IP-POOL) is a subset of an IP address pool used by the PGW (PGW-IP-POOL);

When UE1 accesses to a network of the architecture illustrated in FIG. 8, an IP address (IP1) is allocated to UE1. The IP1 belongs to the LGW-IP-POOL and the PGW-IP-POOL simultaneously. Similarly, when UE2 accesses to the network illustrated in FIG. 8, an IP address (IP2) belonging to the LGW-IP-POOL and the PGW-IP-POOL simultaneously is allocated to UE2.

The PGW is capable of identifying whether UE1 and UE2 belong to the same LGW region. Therefore, when IP addresses are allocated to UE1 and UE2, it needs to notify the LGW of a condition of IP address allocation. The judgment about UE1 and UE2 belonging to the same LGW region can be based on information about a location where the UE accesses, for example, a cell location Cell-ID.

Figure 9:
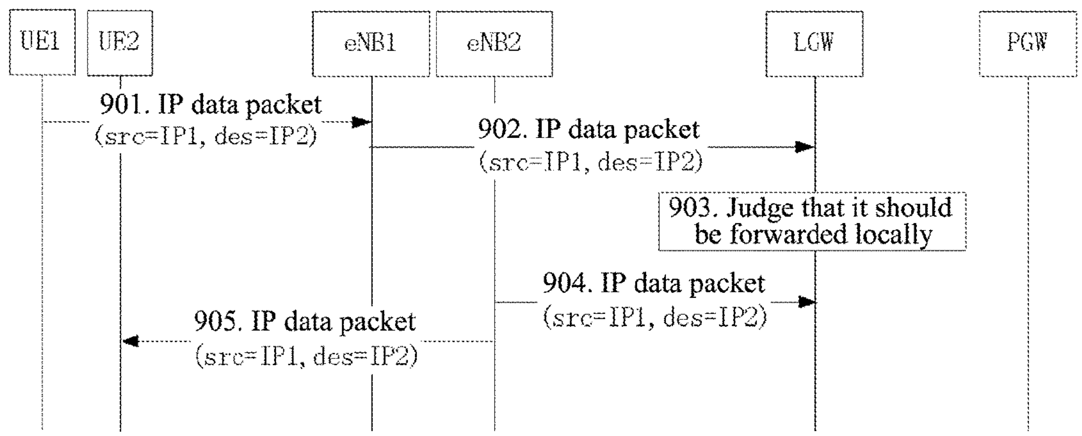
FIG. 9 is a flowchart of an LGW judging that an IP data packet should be forwarded locally according to embodiment three of the present document.

FIG. 9 is a flowchart of an LGW judging that an IP data packet should be forwarded locally according to embodiment three of the present document. In this process, both UE1 and UE2 are under the LGW. FIG. 9 includes the following steps.

In steps 901-902, UE1 transmits an IP data packet to UE2, wherein, the IP data packet is firstly transmitted to the eNodeB1 to which UE1 accesses, and the eNodeB1 forwards the IP data packet to the LGW;

in step 903, after the LGW receives the IP data packet, if the LGW judges that the IP2 used by UE2 belongs to an IP address pool of the LGW (LGW-IP-POOL), a local switching mode should be used;

in step 904, the LGW directly forwards the IP data packet to the eNodeB2 to which UE2 accesses;

in step 905, the eNodeB2 forwards the IP data packet to UE2.

Figure 10:
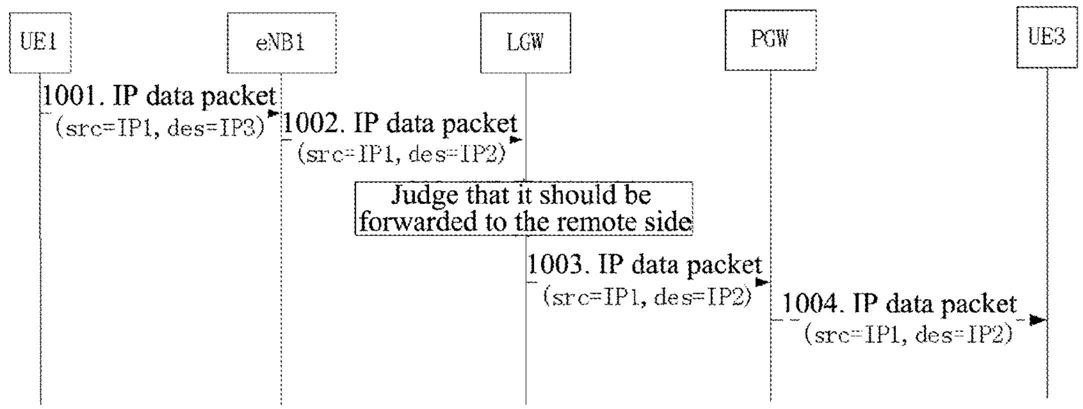
FIG. 10 is a flow diagram of an LGW judging that an IP data packet should be forwarded to an ancestor node according to embodiment three of the present document.

FIG. 10 is a flow diagram of an LGW judging that an IP data packet should be forwarded to an ancestor node according to embodiment three of the present document. In this process, UE1 is located under the LGW1, and UE3 neither belongs to the LGW, nor belongs to the PGW. FIG. 10 includes the following steps.

In steps 1001-1002, UE1 transmits an IP data packet to UE3, wherein, the IP data packet is firstly transmitted to the eNodeB1 to which UE1 accesses, and the eNodeB1 forwards the IP data packet to the LGW;

in step 1002, after the LGW receives the IP data packet, if the LGW judges that the IP3 used by UE3 does not belong to an IP address pool of the LGW (LGW-IP-POOL), a mode of forwarding to the ancestor should be used;

in step 1003, the LGW transmits the IP data packet to the PGW through a direct tunnel;

in step 1004, the PGW finally transmits the IP data to UE3 according to a routing/forwarding rule;

if there is another UE3 and its IP address is located outside an IP address pool of the PGW (PGW-IP-POOL), the IP data packet transmitted by UE1 to UE3 is firstly routed to the LGW. If the LGW judges that a target IP address (IP3) is not in the LGW-IP-POOL, the IP data packet is forwarded to the PGW through the direct tunnel. After receiving the IP data packet, if the PGW judges that the target IP address (IP3) is not in the PGW-IP-POOL, the PGW continues to forward the IP data packet through a routing/forwarding rule, so that the IP data packet is finally routed to UE3.

Figure 11:
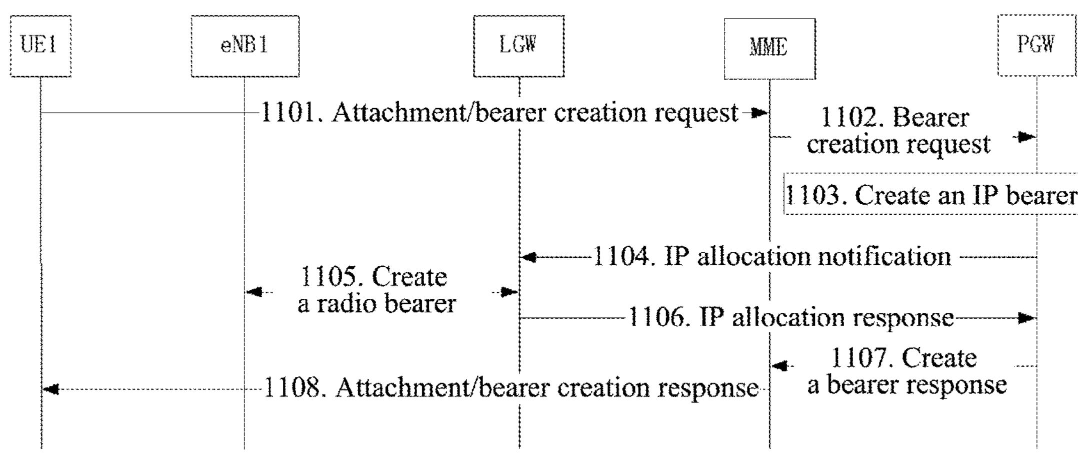
FIG. 11 is a flow of IP address allocation of a UE under architecture illustrated in FIG. 8 according to embodiment four of the present document.

FIG. 11 is a flow of IP address allocation of a UE under architecture illustrated in FIG. 8 according to embodiment four of the present document, which includes the following steps.

In step 1101, a UE requests an attachment to establish an IP bearer;

in step 1102, after receiving the request from the UE, an MME transmits a bearer creation request to a PGW, wherein, the bearer creation request is transmitted to the PGW through an SGW;

in step 1103, after receiving the bearer creation request, the PGW allocates an IP address to the UE to create an IP bearer;

in step 1104, after allocating the IP address to the UE, the PGW notifies the LGW of the allocation of the IP address;

the PGW notifies the LGW in the message that an IP address has been allocated to the UE, and the specific information includes: an ID of the UE (an IMSI or a P-TIMSI, a GUTTI etc.), an IP address of the UE, a PGW address of the UE etc.

In step 1105, the LGW notifies the base station to create a radio bearer for the UE;

in step 1106, the LGW returns an IP allocation response to the PGW;

in step 1107, the PGW returns a bearer creation response to the MME;

in step 1108, the MME returns an attach/bearer creation response to the UE.

Accordingly, when IP address allocation of the UE changes or an IP bearer of the UE is released, the PGW needs to transmit a notification to the LGW to notify that the IP address of the UE is changed or the IP address of the UE released. Thereby, the LGW can timely deregister the IP address of the UE.

Figure 12:
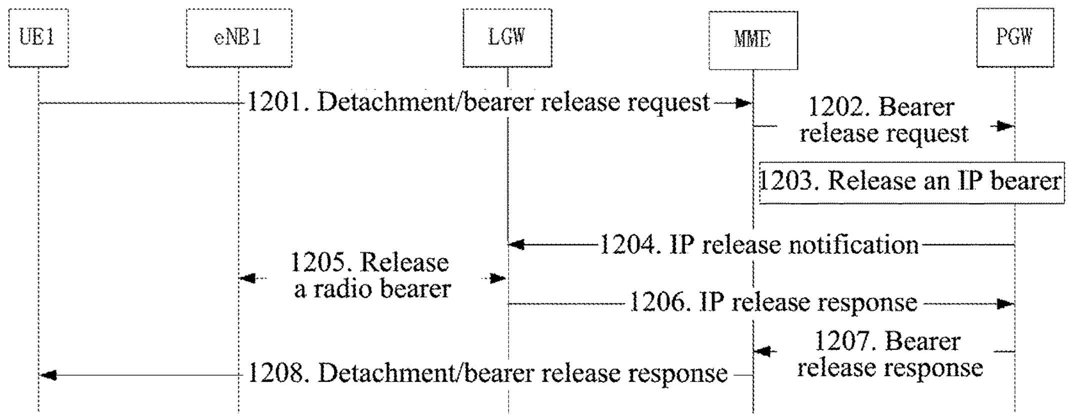
FIG. 12 is a flow of IP address release of a UE under architecture illustrated in FIG. 8 according to embodiment five of the present document.

FIG. 12 is a flow diagram of IP address release of a UE under architecture illustrated in FIG. 8, according to embodiment five of the present document. In this process, when the PGW releases an IP address of the UE, the PGW transmits a notification to the LGW, to notify that the IP address of the UE has been released, and thereby, the LGW performs a corresponding deregistration operation.

As shown in FIG. 12, it includes the following steps.

In step 1201, the UE transmits a detachment request/bearer release request to the MME;

in step 1202, after receiving the request from the UE, the MME transmits a bearer release request to the PGW, wherein, the bearer release request is transmitted to the PGW through the SGW;

in step 1203, after receiving the bearer release request, the PGW releases the IP bearer of the UE;

in step 1204, after releasing the IP address of the UE, the PGW notifies the release of the IP address to the LGW;

in step 1205, the LGW notifies the base station to release the radio bearer of the UE;

in step 1206, the LGW returns an IP release response to the PGW;

in step 1207, the PGW returns a bearer release response to the MME;

in step 1208, the MME returns a detachment/bearer release response to the UE.

Figure 13:
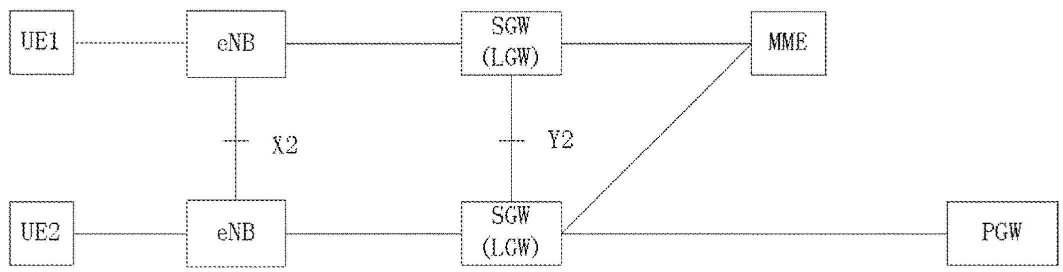
FIG. 13 is architecture of deploying an LGW on an SGW according to embodiment six of the present document.

In a specific application, the LGW can be deployed on the SGW, to become a logical function of the SGW, as shown in FIG. 13. Further, in the specific deployment scheme, the idea of embodiment one can further be applied, i.e., the LGW is integrated on the SGW, and a direct tunnel is established between two SGWs/LGWs. The specific mode is that after the SGW/LGW receives the IP data packet, it is firstly judged whether the IP data packet can be forwarded to a target base station directly in a mode where the LGW is deployed, and if not, the IP data packet is transmitted to the PGW, the PGW judges and notifies that a direct tunnel is established between two SGWs/LGWs, a source SGW/LGW forwards the IP data of the UE to a target SGW/LGW through the direct tunnel, and then the target SGW/LGW transmits the IP data to the target base station.

Similarly, the LGW can be deployed on a base station eNodeB, and a direct tunnel can be provided between the LGWs to implement the direct tunnel between the base stations.

The embodiments of the present document further provide a local switching system for user plane data, comprising a level 1 data node and a source level 2 data node, wherein, the level 1 data node is configured to judge whether a direct tunnel can be established for a source User Equipment (UE) and a target UE after being triggered, and if so, indicate the source level 2 data node and a target level 2 data node to establish a direct tunnel for the source UE and the target UE; and the source level 2 data node is configured to establish the direct tunnel with the target level 2 data node after receiving the indication from the level 1 data node; and forward an IP data packet to the target level 2 data node through the direct tunnel between the source level 2 data node and the target level 2 data node after receiving the IP data packet transmitted by the source UE to the target UE, so that the target level 2 data node forwards the IP data packet to the target UE.

Wherein, the triggering is that the level 1 data node receives the IP data packet transmitted by the source UE to the target UE, or receives a notification transmitted by an ancestor data node that a direct tunnel is established for the source UE and the target UE.

Wherein, the system further comprises the ancestor data node, configured to notify the level 1 data node to establish a direct tunnel for the source UE and the target UE in the following case:

after receiving the IP data packet transmitted by the source UE to the target UE, the ancestor data node judges that a direct tunnel can be established for the source UE and the target UE, and notifies the level 1 data node to establish the direct tunnel for the source UE and the target UE.

Wherein, the level 1 data node judges whether a direct tunnel can be established for the source UE and the target UE according to the following factor:

judging according to an identity and/or IP address of the source UE and an identity and/or IP address of the target UE.

Wherein, the level 1 data node is a packet data network gateway, the source level 2 data node is a source serving gateway, the target level 2 data node is a target serving gateway.

Wherein, the level 1 data node is a serving gateway, the source level 2 data node is a source base station, and the target level 2 data node is a target base station.

Wherein, when the source level 2 data node and the target level 2 data node are the same base station, establishing a direct tunnel between the source level 2 data node and the target level 2 data node refers to establishing a direct tunnel for the source UE and the target UE in the base station.

Wherein, the source level 2 data node is further configured to release the direct tunnel between the source UE and the target UE after the IP address of the source UE or the target UE is released.

Figure 14:
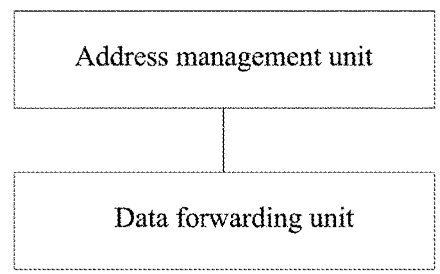
FIG. 14 is a block diagram of an LGW according to an embodiment of the present document.

The embodiments of the present document further provide a Local Gateway (LGW), as shown in FIG. 14, comprising:

an IP address management unit, configured to register or deregister an IP address of a User equipment (UE) after receiving a notification that a public data network gateway allocates an IP address to the UE or releases the IP address of the UE; and a data forwarding unit, configured to judge whether an IP address of a target UE is registered on the LGW after receiving an IP data packet forwarded by a source base station which is transmitted by a source UE to the target UE, and if so, transmit the IP data packet to a target base station to which the target UE is connected.

Wherein, the data forwarding unit is further configured to forward the IP data packet to an ancestor node when judging that the IP address of the target UE is not registered on the LGW.

Wherein, the data forwarding unit is further configured to establish with a target node indicated by the ancestor node a direct tunnel between the source UE and the target UE after receiving an indication from the ancestor node, and forward the IP data packet to the target node through the direct tunnel after subsequently receiving an IP data packet transmitted by the source UE to the target UE, so that the target node forwards the IP data packet to the target UE.

Wherein, the LGW is deployed on the base station or is deployed on a serving gateway or is independently deployed and connected to the base station and the serving gateway.

The embodiments of the present document further provide a local switching system for user plane data, comprising the above LGW, and further comprising a public data network gateway, configured to notify an allocation or release of an IP address of a User Equipment (UE) to the LGW to which the UE belongs after allocating an IP address to the UE or releasing the IP address of the UE.

In another embodiment, software is further provided, which is used to perform technical schemes in the above embodiments and preferred embodiments.

In another embodiment, a storage medium is further provided, which stores the above software, and includes but is not limited to a disc, a floppy disk, a hard disk, an erasable memory etc.

Obviously, those skilled in the art should understand that each module or each step of the aforementioned present document can be implemented with general computing devices, and can be integrated in a single computing device, or distributed onto a network consisting of a plurality of computing devices; alternatively, they can be implemented with program codes executable by the computing devices, and therefore, they can be stored in storage devices to be executed by the computing devices; and in some cases, the steps shown or described can be performed in an order different from that in here; alternatively, they are respectively made into various integrated circuit modules; alternatively, it is implemented with making several modules or steps of them into a single integrated circuit module. Thus, the present document is not limited to any specific combinations of hardware and software.

The above description is only the preferred embodiments of the present document and is not intended to limit the present document. The embodiments can have a variety of changes and variations for those skilled in the art. Any modification, equivalent substitution, improvement etc. which are made within the spirit and principle of the present document should be included in the protection scope of the present document.

INDUSTRIAL APPLICABILITY

With the embodiments of the present document, effects of optimizing IP data forwarding and reducing load of the public data network gateway (GGSN/PGW) are achieved.

What is claimed is:

1. A local switching method for user plane data, comprising:

deploying a Local Gateway (LGW) in a network;

after allocating an IP address to a User Equipment (UE) or releasing an IP address of the UE, a public data network gateway notifying the allocation or release of the IP address of the UE to the LGW to which the UE belongs, and the LGW registering or deregistering the IP address of the UE; and after receiving an IP data packet forwarded by a source base station which is transmitted by a source UE to a target UE, the LGW judging whether the IP address of the target UE is registered on the LGW, and if so, transmitting the IP data packet to a target base station to which the target UE is connected.

2. The method according to claim 1, wherein, the method further comprises: when judging that the IP address of the target UE is not registered on the LGW, the LGW forwarding the IP data packet to an ancestor node.

3. The method according to claim 2, wherein, the method further comprises:

after receiving an indication from the ancestor node, the LGW establishing with a target node indicated by the ancestor node a direct tunnel between the source UE and the target UE, and after subsequently receiving an IP data packet transmitted by the source UE to the target UE, forwarding the IP data packet to the target node through the direct tunnel, so that the target node forwards the IP data packet to the target UE.

4. The method according to claim 3, wherein, the LGW is deployed on the base station or is deployed on a serving gateway or is independently deployed and connected to the base station and the serving gateway.

5. The method according to claim 2, wherein, the LGW is deployed on the base station or is deployed on a serving gateway or is independently deployed and connected to the base station and the serving gateway.

6. The method according to claim 1, wherein, the LGW is deployed on the base station or is deployed on a serving gateway or is independently deployed and connected to the base station and the serving gateway.

7. A Local Gateway (LGW), comprising:

an IP address management unit, configured to register or deregister an IP address of a User equipment (UE) after receiving a notification that a public data network gateway allocates an IP address to the UE or releases the IP address of the UE; and a data forwarding unit, configured to judge whether an IP address of a target UE is registered on the LGW after receiving an IP data packet forwarded by a source base station which is transmitted by a source UE to the target UE, and if so, transmit the IP data packet to a target base station to which the target UE is connected.

8. The LGW according to claim 7, wherein, the data forwarding unit is further configured to forward the IP data packet to an ancestor node when judging that the IP address of the target UE is not registered on the LGW.

9. The LGW according to claim 8, wherein, the data forwarding unit is further configured to establish with a target node indicated by the ancestor node a direct tunnel between the source UE and the target UE after receiving an indication from the ancestor node, and forward the IP data packet to the target node through the direct tunnel after subsequently receiving an IP data packet transmitted by the source UE to the target UE, so that the target node forwards the IP data packet to the target UE.

10. The LGW according to claim 9, wherein, the LGW is deployed on the base station or is deployed on a serving gateway or is independently deployed and connected to the base station and the serving gateway.

11. The LGW according to claim 8, wherein, the LGW is deployed on the base station or is deployed on a serving gateway or is independently deployed and connected to the base station and the serving gateway.

12. The LGW according to claim 7, wherein, the LGW is deployed on the base station or is deployed on a serving gateway or is independently deployed and connected to the base station and the serving gateway.

13. A local switching system for user plane data, comprising a Local Gateway (LGW) and a public data network gateway, wherein, the public data network gateway is configured to notify an allocation or release of an IP address of a User Equipment (UE) to the LGW to which the UE belongs after allocating an IP address to the UE or releasing the IP address of the UE;

the LGW comprises:

an IP address management unit, configured to register or deregister the IP address of the UE after receiving the notification that the public data network gateway allocates the IP address to the UE or releases the IP address of the UE; and a data forwarding unit, configured to judge whether an IP address of a target UE is registered on the LGW after receiving an IP data packet forwarded by a source base station which is transmitted by a source UE to the target UE, and if so, transmit the IP data packet to a target base station to which the target UE is connected.

14. The local switching system according to claim 13, wherein, the data forwarding unit in the LGW is further configured to forward the IP data packet to an ancestor node when judging that the IP address of the target UE is not registered on the LGW.

15. The local switching system according to claim 14, wherein, the data forwarding unit in the LGW is further configured to establish with a target node indicated by the ancestor node a direct tunnel between the source UE and the target UE after receiving an indication from the ancestor node, and forward the IP data packet to the target node through the direct tunnel after subsequently receiving an IP data packet transmitted by the source UE to the target UE, so that the target node forwards the IP data packet to the target UE.

* * * * *